Patented May 2, 1939

2,156,597

UNITED STATES PATENT OFFICE 2,156,597

POLYAZO DYESTUFFS

Bertram Mayer and Ernst Alfred Henzi, Basel, Switzerland, assignors to the firm Society of Chemical Industry in Basle, Basel, Switzerland No Drawing. Application December 28, 1936, Serial No. 117,969. In Switzerland January 9, 1936

7 Claims. (Cl. 260—158)

In Patent No. 1,667,327 there is described a series of valuable polyazo-dyestuffs made by causing to react on 1 mol of 1:3-dihydroxybenzene in any order 1 mol of diazotized 2-(4'-amino-phenyl)-6-methylbenzothiazole sulfonic acid and 1 mol of a diazotized paraaminoazo-dyestuff of the general formula $R_1—N=N—R_2—NH_2$, in which $R_1$ and $R_2$ are the same or different aromatic nuclei free from hydroxyl groups.

The dyestuffs obtained in this manner dye cotton valuable tints which are characterized by good properties of fastness. On the other hand their affinity to vegetable fibers is not quite satisfactory.

The present invention relates to the manufacture of dyestuffs of similar composition which are characterized by an equally good levelling capacity and an enhanced affinity for vegetable fiber as well as by the valuable neutral brown tints of their dyeings on cotton. The manufacture consists in causing to react on 1:3-dihydroxybenzene in any order 1 mol of diazotized primuline which, as is known, is a mixture of the benzthiazole sulfonic acids of the formulae

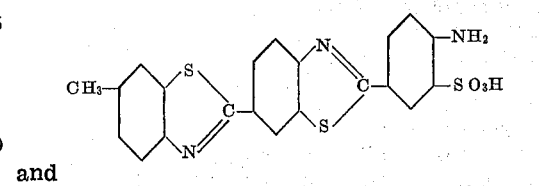

and (cf. Colour Index No. 812) and 1 mol of a diazotized para-aminoazo-dyestuff of the general formula $R_1—N=N—R_2—NH_2$ in which $R_1$ and $R_2$ represent the same or different aromatic nuclei selected from the group consisting of aromatic nuclei of the benzene and naphthalene series and in which at least one of the two radicals $R_1$ and $R_2$ contains at least one sulfonic acid group.

In this manner there are obtained dyestuffs of the general formula

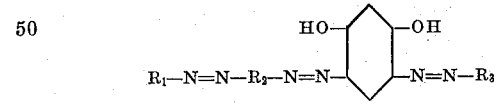

in which $R_1$ stands for a radical selected from the group consisting of aromatic radicals of the benzene and naphthalene series, $R_2$ stands for an aromatic nucleus selected from the group consisting of aromatic nuclei of the benzene and naphthalene series, the two azo-groups being linked to this aromatic nucleus in the 1- and 4- position, and $R_3$ stands for the radical of primuline, in which further at least one of the two radicals $R_1$ and $R_2$ contains at least one sulfonic acid group, which products are dark powders dissolving in water to brown solutions and in sulfuric acid to red-violet to green and grey-green solutions, and dye cotton, viscose rayon and leather brown tints, and which dyestuffs, when being dyed on union fabrics consisting of cotton and acetate artificial silk, leave the latter fiber undyed.

The following examples illustrate the invention, the parts being by weight:

*Example 1*

The aminoazo-dyestuff from 19.5 parts of diazotized sodium-1-aminobenzene-4-sulfonate and 24.5 parts of sodium-1-aminonaphthalene-6- or 7-sulfonate is diazotized in the usual manner and the diazo-compound is coupled in the presence of sodium carbonate with the monoazo-dyestuff from diazotized primuline and 1:3-dihydroxybenzene. This monoazo-dyestuff is produced by diazotizing 58.6 parts of primuline (sulfonated primuline base), adding the diazo-compound to an aqueous solution of 11 parts of 1:3-dihydroxybenzene and after prolonged stirring neutralizing the mineral acid with dilute sodium carbonate solution. When coupling is complete the monoazo-dyestuff is salted out in the usual manner, filtered and again stirred with water. The coupling to form the trisazo-dyestuff is soon at an end. The dyestuff produced of the formula

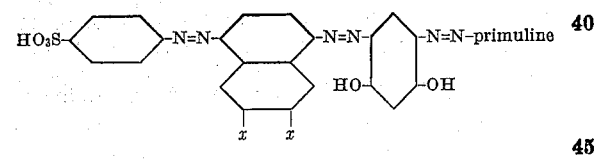

wherein one $x$ stands for a hydrogen atom and the other $x$ for a $SO_3H$-group, is salted out, filtered and dried. It is a black-brown powder which dissolves in water to a brown solution and in concentrated sulfuric acid to a grey-green solution. The dyestuff dyes cotton brown.

The same dyestuff is produced when the diazo-compound of the above aminoazo-dyestuff from diazotized 1-aminobenzene-4-sulfonic acid and 1-aminonaphthalene-6- or 7-sulfonic acid is allowed to act in presence of sodium carbonate on 1:3-dihydroxybenzene and the diazo-dyestuff thus produced is coupled in the usual manner with diazotized primuline.

Similar dyestuffs are produced when the 1-aminobenzene-4-sulfonic acid is exchanged for 1-aminobenzene-3-sulfonic acid or 1-aminobenzene-2-sulfonic acid or for an aminomethylbenbene sulfonic acid or for an aminomethoxybenzene sulfonic acid. There may also be used as an initial component an aminobenzenedisulfonic acid and as a middle component a component of the naphthalene series, such as 1-aminonaphthalene, 1-amino-2-methoxynaphthalene, or 1-aminonaphthalene-6- or 7-sulfonic acid.

Example 2

30 parts of sodium aminoazobenzene sulfonate are diazotized in the usual manner. The diazo-compound is then allowed to act in a solution alkaline with sodium carbonate on the monoazo-dyestuff described in Example 1 from 58.6 parts of diazotized primuline and 11 parts of 1:3-dihydroxybenzene. When coupling is complete the trisazo-dyestuff thus produced of the formula

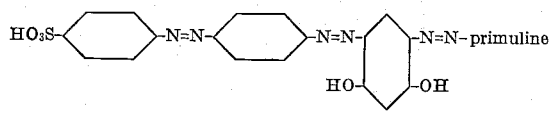

is salted out, filtered and dried. It is a dark powder soluble in water to a yellow-brown solution and in concentrated sulfuric acid to a red-violet solution. It dyes cotton orange-brown.

Similar dyestuffs are obtained by using a para-aminoazo-dyestuff obtained in the known manner by coupling a diazo-compound from a sulfonic acid of aminobenzene, of aminomethylbenzene, of aminochlorobenzene, of aminomethylchlorobenzene, of aminonitrobenzene or of an aminophenol ether with a so-called middle component of the benzene series, for instance aniline, 1-amino-2-methylbenzene, 1-amino-2:5-dimethylbenzene, 1-amino-2-methoxybenzene, 1-amino-2-ethoxybenzene or 1-amino-2-methoxy-5-methylbenzene. Para-aminoazo-dyestuffs which are sulfonated in both nuclei such as aminoazomethylbenzene disulfonic acids (obtained by sulfonating 4-amino-3:2'-dimethylazobenzene) may also be used.

Example 3

30.3 parts of 2-aminonaphthalene-4:8-disulfonic acid are diazotized in the usual manner and coupled with 13.7 parts of 1-amino-2-methoxy-5-methylbenzene. When coupling is complete the aminoazo-dyestuff thus obtained is further diazotized in the usual manner with nitrite and hydrochloric acid and coupled in a solution alkaline with sodium carbonate with the monoazo-dyestuff described in Example 1 from 58.6 parts of diazotized primuline and 11 parts of 1:3-dihydroxybenzene. Coupling is complete after a short time. The trisazo-dyestuff thus produced of the formula

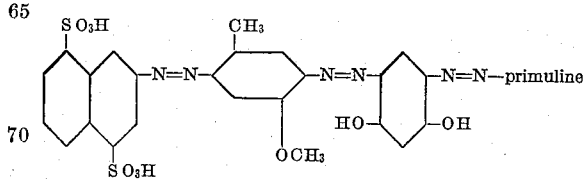

is salted out at 60–70° C., filtered and dried. It is a black-brown powder which dissolves in water to a red-brown solution and in concentrated sulfuric acid to a violet solution. It dyes cotton red-brown.

The 2-aminonaphthalene-4:8-disulfonic acid may be exchanged for another mono- or disulfonic acid which is derived from 1- or 2-aminonaphthalene and the 1-amino-2-methoxy-5-methylbenzene may be exchanged for another primary amine having an unoccupied 4-position (a so-called middle component of the benzene series), such as 1-amino-2:5-dimethylbenzene, 1-amino-3-methylbenzene, 1-amino-2-methoxybenzene, 1-amino-2-methylbenzene or aniline.

Example 4

The aminoazodyestuff from 30.3 parts of 2-aminonaphthalene-4:8-disulfonic acid and 14.3 parts of 1-aminonaphthalene is diazotized in the usual manner. The diazo-compound is then caused to react in a solution alkaline with sodium carbonate with the monoazo-dyestuff described in Example 1 from 58.6 parts of diazotized primuline and 11 parts of 1:3-dihydroxybenzene. When coupling is complete the trisazo-dyestuff thus obtained of the formula

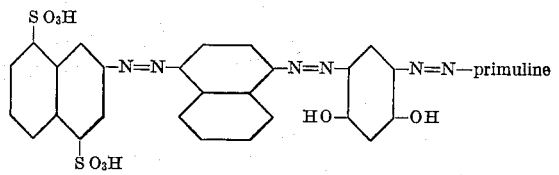

is filtered and dried. It is a dark powder soluble in water to a brown solution and in concentrated sulfuric acid to an olive-colored solution. The dyeing on cotton is violetish brown.

Instead of 2-aminonaphthalene-4:8-disulfonic acid there may be used aminonaphthalene-monosulfonic acids, for instance 2-aminonaphthalene-6-sulfonic acid or 1-aminonaphthalene-2- or 3- or 4- or 5- or 6- or 7-sulfonic acid or an aminonaphthalene disulfonic acid, for instance 1-aminonaphthalene-3:6- or 4:6-disulfonic acid. Instead of 1-aminonaphthalene there may be used a substitution product thereof capable of being coupled in 4-position. For example, there may be formed the dyestuff 1-aminonaphthalene-6- or 7-sulfonic acid→1-aminonaphthalene-6- or 7-sulfonic acid→1:3-dihydroxy-benzene←primuline. It is a black-brown powder soluble in concentrated sulfuric acid to a green solution and in water on addition of sodium carbonate solution to a violet-brown solution; it dyes cotton violet-brown.

What we claim is:

1. The polyazo-dyestuffs of the general formula

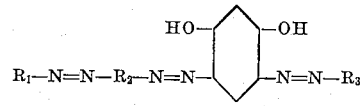

in which $R_1$ stands for a radical selected from the group consisting of aromatic radicals of the benzene and naphthalene series, $R_2$ stands for an aromatic nucleus selected from the group consisting of aromatic nuclei of the benzene and naphthalene series, the azo-groups being linked to this aromatic nucleus in the 1- and 4-position, and $R_3$ stands for the radical of primuline, in which further at least one of the two radicals $R_1$ and $R_2$ contains at least one sulfonic acid group, the radicals $R_1$ and $R_2$ being otherwise unsubstituted, which products are dark powders dissolving in water to brown solutions and in sulfuric acid to red-violet to green and grey-green solutions, and dye cotton, viscose rayon, and leather brown tints, and which dyestuffs, when being dyed on union fabrics consisting of cotton and acetate artificial silk, leave the latter fiber undyed.

2. The polyazo-dyestuffs of the general formula

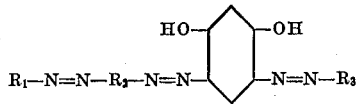

in which $R_1$ stands for a radical selected from the group consisting of aromatic radicals of the benzene and naphthalene series, $R_2$ stands for an aromatic nucleus of the benzene series, the azo-groups being linked to this aromatic nucleus in the 1- and 4-position, and $R_3$ stands for the radical of primuline, in which further at least one of the two radicals $R_1$ and $R_2$ contains at least one sulfonic acid group, the radicals $R_1$ and $R_2$ being otherwise unsubstituted, which products are dark powders dissolving in water to brown solutions and in sulfuric acid to red-violet to green and grey-green solutions, and dye cotton, viscose rayon, and leather brown tints, and which dyestuffs, when being dyed on union fabrics consisting of cotton and acetate artificial silk, leave the latter fiber undyed.

3. The polyazo-dyestuffs of the general formula

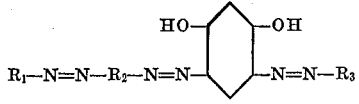

in which $R_1$ stands for a radical of the benzene series, $R_2$ stands for an aromatic nucleus of the benzene series, the azo-groups being linked to this aromatic nucleus in the 1- and 4-position, and $R_3$ stands for the radical of primuline, in which further at least one of the two radicals $R_1$ and $R_2$ contains at least one sulfonic acid group, the radicals $R_1$ and $R_2$ being otherwise unsubstituted, which products are dark powders dissolving in water to brown solutions and in sulfuric acid to red-violet solutions, and dye cotton, viscose rayon, and leather brown tints, and which dyestuffs, when being dyed on union fabrics consisting of cotton and acetate artificial silk, leave the latter fiber undyed.

4. The polyazo-dyestuffs of the general formula

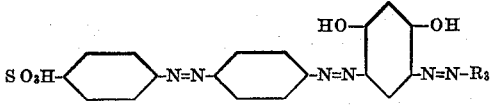

in which $R_3$ stands for the radical of primuline, the said dyestuffs containing no further substituents, which products are dark powders dissolving in water to brown solutions and in sulfuric acid to red-violet solutions, and dye cotton, viscose rayon, and leather brown tints, and which dyestuffs, when being dyed on union fabrics consisting of cotton and acetate artificial silk, leave the latter fiber undyed.

5. The polyazo-dyestuffs of the general formula

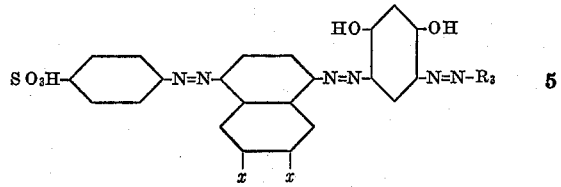

in which $R_3$ stands for the radical of primuline and one $x$ stands for a hydrogen atom and the other $x$ for a sulfonic acid group, the said dyestuffs containing no further substituents, which products are dark powders dissolving in water to brown solutions and in sulfuric acid to green to grey-green solutions, and dye cotton, viscose rayon, and leather brown tints, and which dyestuffs, when being dyed on union fabrics consisting of cotton and acetate artificial silk, leave the latter fiber undyed.

6. The polyazo-dyestuffs of the general formula

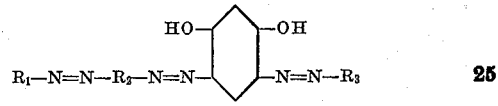

in which $R_1$ stands for a radical selected from the group consisting of aromatic radicals of the benzene and naphthalene series, $R_2$ stands for an aromatic nucleus of the napthalene series, the azo-groups being linked to this aromatic nucleus in the 1- and 4-position, and $R_3$ stands for the radical of primuline, in which further at least one of the two radicals $R_1$ and $R_2$ contains at least one sulfonic acid group, the radicals $R_1$ and $R_2$ being otherwise unsubstituted, which products are dark powders dissolving in water to brown solutions and in sulfuric acid to green to grey-green solutions, and dye cotton, viscose rayon, and leather brown tints, and which dyestuffs, when being dyed on union fabrics consisting of cotton and acetate artificial silk, leave the latter fiber undyed.

7. The polyazo-dyestuffs of the general formula

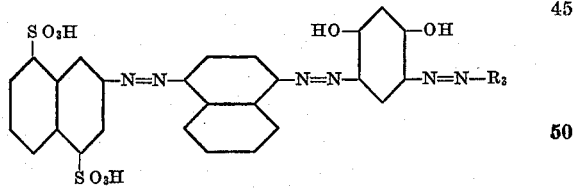

in which $R_3$ stands for the radical of primuline, the said dyestuffs containing no further substituents which products are dark powders dissolving in water to brown solutions and in sulfuric acid to green to grey-green solutions, and dye cotton, viscose rayon, and leather brown tints, and which dyestuffs, when being dyed on union fabrics consisting of cotton and aceate artificial silk, leave the latter fiber undyed.

BERTRAM MAYER.
ERNST ALFRED HENZI.